(12) United States Patent
Lehmann

(10) Patent No.: US 6,763,742 B1
(45) Date of Patent: Jul. 20, 2004

(54) TORQUE LIMITING MECHANISM FOR A MECHANICAL ASSIST MOBILE STORAGE SYSTEM

(75) Inventor: Steven M. Lehmann, Fort Atkinson, WI (US)

(73) Assignee: Spacesaver Corporation, Fort Atkinson, WI (US)

(*) Notice: Subject to any disclaimer, the term of this patent is extended or adjusted under 35 U.S.C. 154(b) by 0 days.

(21) Appl. No.: 10/008,557

(22) Filed: Nov. 13, 2001

Related U.S. Application Data

(63) Continuation-in-part of application No. 09/514,490, filed on Feb. 29, 2000, now abandoned.

(51) Int. Cl.[7] .............................. G05G 5/06; G05G 1/04; A47B 95/00
(52) U.S. Cl. .............................. 74/527; 74/526; 312/198
(58) Field of Search ................... 74/527, 526; 104/287; 105/104; 312/198

(56) References Cited

U.S. PATENT DOCUMENTS

| | | | |
|---|---|---|---|
| 3,602,245 A | | 8/1971 | Meisel |
| 3,754,412 A | | 8/1973 | Briggs |
| 3,923,354 A | | 12/1975 | Young |
| 3,944,309 A | | 3/1976 | Taniwaki |
| 4,138,173 A | * | 2/1979 | Taniwaki ............... 312/198 |
| 4,153,312 A | * | 5/1979 | Taniwaki ............... 312/198 |
| 4,256,355 A | | 3/1981 | Yamaguchi et al. |
| 4,368,857 A | * | 1/1983 | Jacob et al. ............ 242/84.5 A |
| 4,559,027 A | * | 12/1985 | Sattel ..................... 474/116 |
| 4,619,437 A | | 10/1986 | Williams et al. |
| 4,746,320 A | | 5/1988 | Kilwin |
| 4,840,083 A | | 6/1989 | Hagan et al. |
| 5,139,318 A | | 8/1992 | Broxup |
| 5,148,754 A | | 9/1992 | Lahti et al. |
| 6,073,512 A | | 6/2000 | McCormick et al. |

FOREIGN PATENT DOCUMENTS

| | | |
|---|---|---|
| GB | 2155308 | 9/1985 |
| WO | WO 98/02063 | 1/1998 |

* cited by examiner

*Primary Examiner*—Vinh T. Luong
(74) *Attorney, Agent, or Firm*—Boyle Fredrickson Newholm Stein & Gratz S.C.

(57) ABSTRACT

A mobile storage unit includes a drive system which is operable in response to rotation of an actuator handle mounted to the mobile storage unit. A torque limiting mechanism is interposed between the actuator handle and the drive system, for rotating an input member of the drive system in response to rotation of the actuator handle. The torque limiting mechanism de-couples the actuator handle from the drive system input member when an excessive force is applied to the actuator handle, to prevent adverse effects which can result from application of an excessive force to the components of the drive system. The torque limiting mechanism includes a hub mounted to the actuator handle and an input member mounted to an input shaft associated with the mobile storage unit drive system, and prevents rotation of the input member when the force applied to the hub member exceeds a predetermined threshold.

9 Claims, 3 Drawing Sheets

FIG. 3
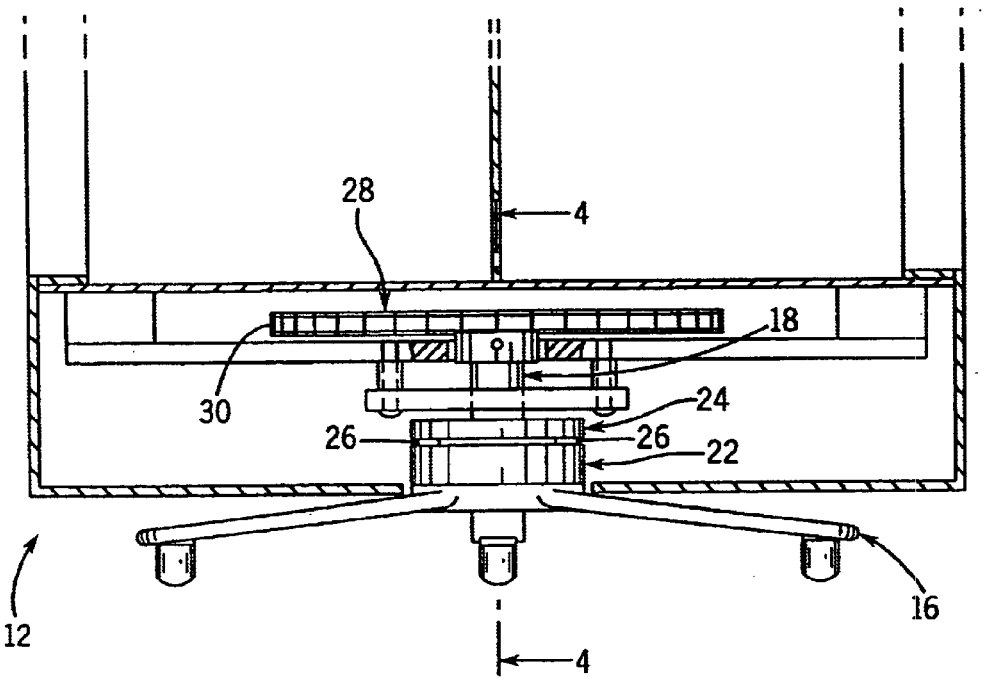
FIG. 4
FIG. 5
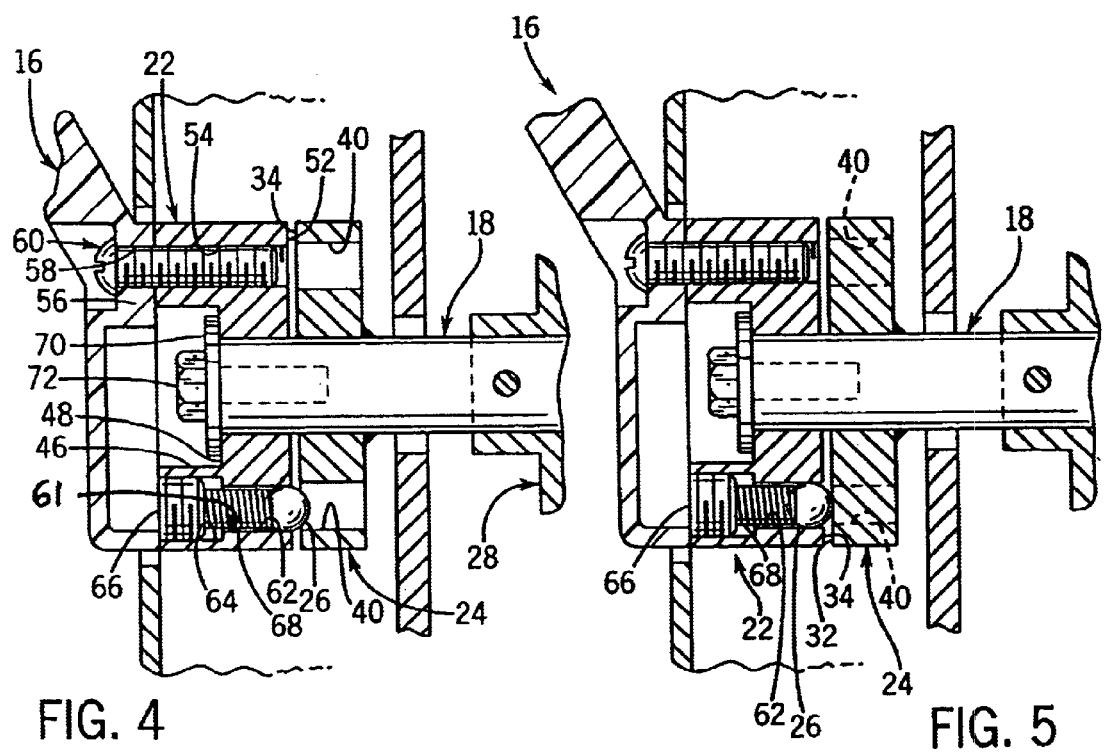

US 6,763,742 B1

TORQUE LIMITING MECHANISM FOR A MECHANICAL ASSIST MOBILE STORAGE SYSTEM

This application is a continuation-in-part of application Ser. No. 09/514,490 filed Feb. 29, 2000, now abandoned.

BACKGROUND AND SUMMARY OF THE INVENTION

This invention relates to a high density mobile storage system, and more particularly to an actuator mechanism for a mechanical assist mobile storage system.

A mechanical assist mobile storage system typically includes a series of storage units movable on a transversely extending rail arrangement. Each storage unit includes a chain-driven assist mechanism which moves the storage unit on the rail arrangement in response to manual operation of a rotatable actuating handle. Rotation of the handle results in rotation of a drive sprocket. A chain is trained about the drive sprocket as well as the remaining components of the drive system, such that rotation of the handle and drive sprocket provides movement of the chain to operate the components of the drive system. The chain is engaged with a sprocket mounted to an adjustable tensioning arm, which is operable to maintain an appropriate amount of tension in the chain.

In an existing assembly, the handle is mounted to a rotatable hub which is mounted to the outer end of a shaft. The drive sprocket is mounted to the inner end of the shaft, such that rotation of the handle imparts rotation to the drive sprocket through the hub and the shaft. While this arrangement operates satisfactorily, problems can arise when an excessive amount of torque is applied to the handle, such as when the storage unit has reached the full limit of its travel and force is still applied to the handle, or when an operator attempts to crank the handle with a force beyond that required to attain maximum speed of movement of the storage unit. In such situations, the excess force applied to the handle can result in excessive wear or stretching of the chain, or can cause movement of the chain tensioning mechanism out of position. In either case, a service call is typically required to return the unit to an operative condition, typically by adjustment of the chain tensioning mechanism.

It is an object of the present invention to provide a mechanical assist mobile storage system which eliminates the adverse effects experienced by the components of the drive system upon application of excessive force to the handle beyond that required to move the storage unit at its maximum speed. It is a further object of the invention to provide an actuator arrangement which isolates the handle from the components of the drive system when an excessive force is applied to the handle. A still further object of the invention is to provide such an actuator arrangement which is simple in its design and construction, yet which functions effectively to prevent the drive sprocket from experiencing excessive forces. A still further object of the invention is to provide such an actuator arrangement which is inexpensive to incorporate into the drive system and which substantially reduces or eliminates the need for service calls resulting from application of excessive forces to the actuator handle of a mechanical assist mobile storage system.

In accordance with the invention, an actuating arrangement for a mobile storage system includes an actuator handle rotatably mounted to a storage unit and a drive arrangement located within the storage unit for moving the storage unit in response to operation of the actuator handle. A torque limiting mechanism is interposed between the handle and the drive arrangement. The torque limiting mechanism is operable to transmit torque to an input or drive shaft of the drive arrangement upon manual rotation of the handle by an operator, to provide movement of the storage unit. The torque limiting mechanism is further operable to prevent transmission of torque to the input shaft exceeding a predetermined threshold, so as to isolate the input shaft from excessive torque resulting from application of a force to the actuator handle beyond that required to move the storage unit at its maximum speed of movement.

The torque limiting mechanism includes a hub member operatively connected to the actuator handle. An input member is mounted to the input shaft such that an end portion of the input shaft extends from the input member. The hub member includes a passage within which the end portion of the input shaft is received. A retainer member is secured to the end of the input shaft and engaged with the hub member, so as to retain the hub member in position on the end portion of the input shaft. The hub member and the input member define facing surfaces, which are preferably spaced slightly apart from each other.

A torque limiting coupling arrangement is interposed between the facing surfaces of the hub member and the input member, and is operable to isolate the input shaft from excessive forces applied to the actuator handle. In one version, the torque limiting coupling arrangement is in the form of a series of spherical engagement members, each of which is received within a passage which is preferably formed in the hub member. The hub member passages open onto the surface of the hub member which faces the input member, and the engagement members protrude from the surface of the hub member. Engagement structure is formed in the facing surface of the input member, and the engagement members are selectively received within the engagement structure of the input member for coupling the hub member to the input member, and thereby the actuator handle to the input shaft.

A spring is received within each passage of the hub member, and urges each engagement member outwardly from the surface of the hub member toward the input member, so as to bias the engagement members toward an engaged position in which the engagement members couple the hub member and the input member together. Each spring is retained in position by means of an adjustment member, which enables an operator to adjust the biasing force exerted by the spring on its respective engagement member. Upon application of a force exceeding the predetermined threshold, each engagement member is movable away from its engaged position against the force of its respective spring, so as to de-couple the hub member from the input member. When this occurs, the hub member spins on the end portion of the input shaft without transfer of force from the input handle to the input shaft, and the engagement members ride on the surface of the input member. When the force applied to the actuator handle falls below the predetermined threshold, each engagement member returns to its engaged position in which the engagement member is seated within the engagement structure formed in the surface of the input member, to couple the hub member to the input member and to thereby enable rotation of the input shaft in response to rotation of the handle.

In another version, the torque limiting coupling arrangement is in the form of a slip disc engaged between the facing surfaces of the hub member and the input member. The hub member and the input member are pressed tightly together and are engaged in a friction engagement fit through of the slip disc. Upon application of a force exceeding the predetermined threshold, the frictional engagement provided by the slip disc is overcome and the hub member spins on the end portion of the input shaft without transfer of force from the input handle to the input shaft, so as to de-couple the hub member from the input member. When the force applied to the actuator handle falls below the predetermined threshold, the slip disc is once again operable to couple the hub member to the input member through friction and thereby enables rotation of the input shaft in response to rotation of the handle. In a preferred form, an adjustable pressure member, such as a Belleville spring, is interconnected between the hub member and the input member for varying the frictional engagement provided by the slip disc and thereby the threshold force which de-couples the hub member and the input member.

The invention also contemplates a method of actuating a drive arrangement associated with a mobile storage unit, substantially in accordance with the foregoing summary.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings:

FIG. 3 is a partial section view taken along line 3—3 of FIG. 1;

FIG. 4 is a partial section view taken along line 4—4 of FIG. 3, showing the engagement members of the torque limiting mechanism in an engaged position;

FIG. 5 is a view similar to FIG. 4, showing movement of the engagement members to a disengaged position for preventing application of an excessive force to the drive system;

FIG. 7 is a partial section view similar to FIGS. 4 and 5, showing the embodiment of the torque limiting mechanism of FIG. 6; and.

DETAILED DESCRIPTION OF THE INVENTION

Figure 1:
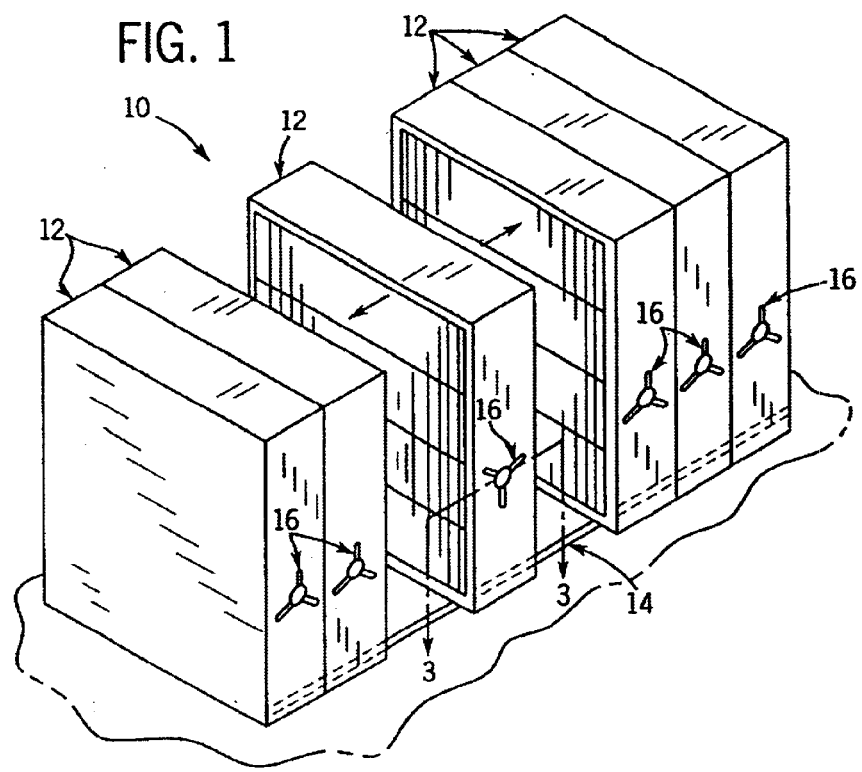
FIG. 1 is an isometric view of a mechanical assist mobile storage system in which the mobile storage units incorporate the torque limiting mechanism of the present invention.

Referring to FIG. 1, a mobile storage system 10 includes a series of mobile storage units 12, each of which is mounted to a pair of tracks, one of which is shown at 14. Mobile storage system 10 is of the type generally known as a mechanical assist system, such as is available from Spacesaver Corporation of Fort Atkinson, Wis. under its Model Nos. DF MA, RG MA, or CF MA. Each mobile storage unit 12 includes an internal drive mechanism which is operable in response to rotation of an external actuator handle 16 for moving the storage unit 12 on tracks 14, in a manner as is known.

Figure 2:
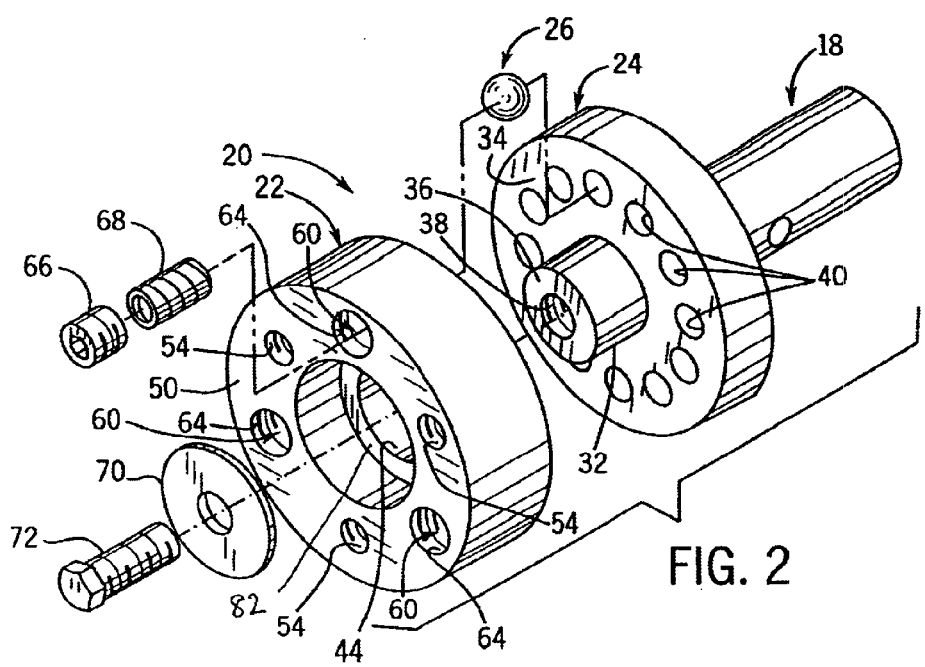
FIG. 2 is an isometric view of the components of the torque limiting mechanism incorporated into each mobile storage unit of FIG. 1.

Referring to FIG. 2, the internal drive system of each mobile storage unit 12 includes an input shaft 18 which is mounted at its inner end to an input sprocket (not shown) or other input drive member. In accordance with the invention, a torque limiting coupling or mechanism 20 is interposed between input shaft 18 and actuator handle 16. In a manner to be explained, torque limiting mechanism 20 selectively couples actuator handle 16 to input shaft 18 for operating the drive system of mobile storage unit 12 for movement on tracks 14. Torque limiting mechanism 20 also selectively disengages actuator handle 16 from input shaft 18 upon application of an excessive force to actuator handle 16, such as a force exceeding the force required to move mobile storage unit 12 on tracks 14 at a maximum rate of movement or a force applied to handle 16 after storage unit 12 has reached the limit of its travel.

Torque limiting mechanism 20 generally includes a hub member 22 to which actuator handle 16 is mounted, an input member 24 mounted to input shaft 18, and a series of engagement members 26 interposed between hub member 22 and input member 24. Referring to FIGS. 2–4, input shaft 18 is mounted at its inner end to an input or drive sprocket 28 with which a flexible drive element such as a chain 30 is engaged. Input member 24 is mounted to input shaft 18 toward the outer end of input shaft 18, such that an outer end portion 32 of input shaft 18 extends outwardly from an outer surface 34 defined by input member 24. Input shaft 18 terminates in an outer end 36, and a threaded passage 38 is formed in outer end portion 32 of input shaft 18, extending inwardly from outer end 36. Input member 24 has a disc-like shape, although it is understood that any other satisfactory shape could be employed. Input member 24 is rigidly mounted to input shaft 18 in any satisfactory manner, such as by welding.

Outer surface 34 of input member 24 is substantially flat, and a series of radially spaced recesses 40 are formed in outer surface 34. Recesses 40 are spaced an equal distance outwardly from the center of input shaft 18 and input member 24. In the illustrated embodiment, recesses 40 are in the form of passages which extend throughout the thickness of input member 24. Recesses 40 may also be formed so as to extend inwardly from outer surface 34 throughout only a portion of the thickness of input member 24.

Hub member 22 defines a central passage 44 within which outer end portion 32 of input shaft 18 is received. A recess 46 is formed in hub member 22 outwardly of central passage 44, and a shoulder 48 is formed between recess 46 and central passage 44. Hub member 22 further includes an annular outer surface 50 and a flat, annular inner surface 52.

A series of threaded actuator mounting passages 54 extend into hub member 22 from outer surface 50. Actuator handle 16 includes a series of mounting bosses 56, each of which is adapted for placement over one of actuator mounting passages 54. An opening 58 is formed in each mounting boss 56, and is located in alignment with one of actuator mounting passages 54. A threaded fastener, such as a screw 60, extends through passage 58 in each mounting boss 56 and into engagement with threads formed in the aligned actuator mounting passage 54, so as to securely and removably engage actuator handle 16 with hub member 22.

Hub member 22 further includes a series of passages 61 which extend outwardly from inner surface 52. Each passage 61 defines a reduced diameter inner section 62 which opens onto inner surface 52, and an enlarged diameter threaded outer section 64 which opens onto outer surface 50. Inner section 62 is sized so as to receive one of spherical engagement members 26 therein, such that engagement member 26 is capable of movement within inner section 62. A screw 66 is engaged with the threads of outer section 64, and a spring 68 bears between screw 66 and engagement member 26. This arrangement functions to urge engagement member 26 outwardly relative to inner surface 52 of hub member 22.

As noted previously, outer end portion 32 of input shaft 18 is received within central passage 44 of hub member 22. A retainer member such as a washer 70 is engaged with outer end 36 of input shaft 18, and overlies shoulder 48 defined by hub member 22. A screw 72 is engaged with threaded passage 38 extending inwardly from outer end 36 of input shaft 18, so as to maintain washer 70 in engagement with outer end 36 of input shaft 18.

In operation, torque limiting mechanism 20 functions as follows to prevent transfer of a force exceeding a predetermined threshold from actuator handle 16 to input shaft 18, to thereby isolate the drive system of mobile storage unit 12 from application of such a force and the resultant adverse effects.

Engagement members 26 are normally positioned as illustrated in FIG. 4, in an engaged position in which each engagement member 26 is seated against the outer edge of one of recesses 40 in input member 24, i.e., in engagement with the edge defined between outer surface 34 and the wall of recess 40. Recess 40 has a diameter less than that of engagement member 26, so as to prevent engagement member 26 from moving into recess 40. With this arrangement, each engagement member 26 engages the edge of recess 40 outwardly of the center of engagement member 26. Spring 68 and set screw 72 function to bias engagement member 26 against the engagement structure defined by passage 40 in input member 24, and engagement members 26 are thus operable to couple hub member 22 to input member 24. In normal operation, rotation of handle 16 results in rotation of hub member 22, and engagement members 26 function to rotate input member 24 along with hub member 22. Such rotation of input member 24 results in rotation of input shaft 18, to provide input power to the drive system of mobile storage unit 12 and to thereby move mobile storage unit 12 in a conventional manner.

When a force exceeding a predetermined threshold is applied to actuator handle 16 and thereby to hub member 22, such force is transferred to engagement members 26 which unseats engagement members 26 from recesses 40 due to the curvature of the portion of engagement members 26 received within recesses 40. Engagement members 26 are thus moved to the disengaged position of FIG. 5 when engagement members 26 are unseated from recesses 40 in input member 24, to de-couple hub member 22 from input member 24. When input member 24 and hub member 22 are de-coupled in this manner, hub member 22 spins on the outer end portion 32 of input shaft 18 while the force applied to handle 16 remains above the predetermined threshold. In this manner, the excessive force is not transferred to input shaft 18, and thus does not adversely impact the components of mobile storage unit 12. The threshold force for moving engagement members 26 to the disengaged position of FIG. 5 may be selected according to the maximum force required to move mobile storage unit 12 at its maximum rate of movement, or by the amount of force otherwise known to damage or cause malfunction of the components of mobile storage unit 12, such as the chain tensioning mechanism, e.g. when a force is applied to handle 16 after mobile storage unit 12 has reached the limit of its travel.

To return engagement members 26 to the engaged position as shown in FIG. 4, the operator continues rotation of actuator handle 16 in either a clockwise or a counterclockwise direction, until engagement members 26 are once again seated in recesses 40, and the applied force falls below the threshold. As can be appreciated, recesses 40 are spaced relatively close together, such that a relatively small amount of travel of actuator handle 16 relative to input shaft 18 is required to seat engagement members 26 in recesses 40. The operator then again applies a force to actuator handle 16 less than the threshold force engagement to maintain members 26 in the engaged position, to impart movement to mobile storage unit 12.

The amount of biasing force exerted by each spring 68 on its respective engagement member 26 can be adjusted by moving set screw 72 within outer section 64 of passage 61. Set screw 72 is turned into passage 61 to increase the threshold, and is moved out of passage 61 to decrease the threshold. Adjustments can easily be made after removing actuator handle 16 by disengaging screws 60 from passages 61.

Figure 6:
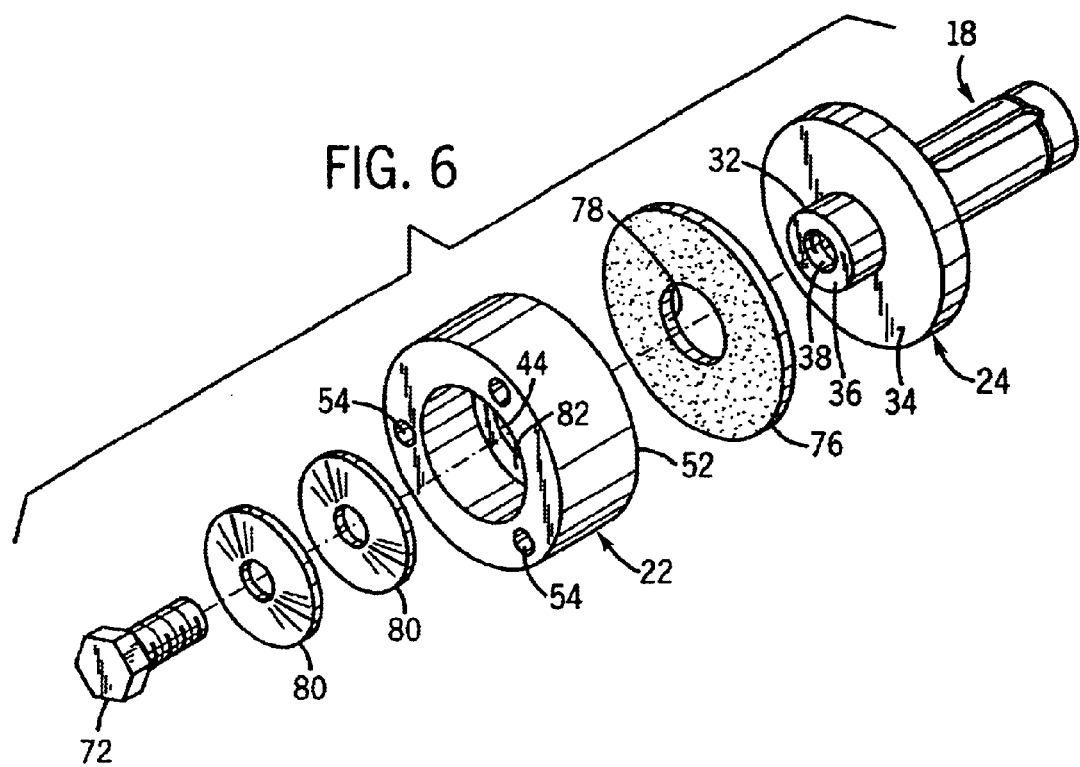
FIG. 6 is an isometric view of the components of another embodiment of the torque limiting mechanism incorporated into each mobile storage unit of FIG. 1.
Figure 7:
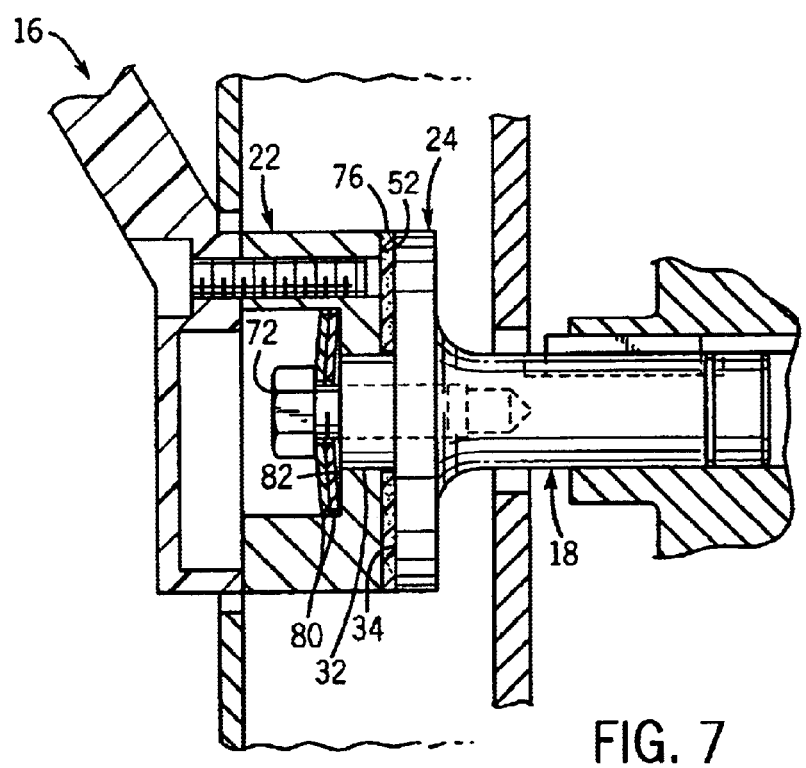

In another embodiment illustrated in FIGS. 6 and 7, torque limiting coupling or mechanism 20 is in the form of a slip disc 76 located between hub member 22 and input member 24. In this version, recesses 40 in input member outer surface 34 are eliminated, as are passages 61 in hub member 22. Slip disc 76 is positioned between and engaged with input member outer surface 34 and hub member inner surface 52, and is operable to selectively couple hub member 22 and input member 24. In a preferred form, slip disc 76 is constructed of a friction washer material such as is available from Friction Material Corporation of Huntington, Ind. under its designation NA-104, although it is understood that other similar types of materials may be employed. Slip disc 76 is formed with a central opening 78, which is located in alignment with central passage 44 of hub member 22 and through which outer end portion 32 of input shaft 18 extends. Slip disc 76 is constructed so as to cover substantially the entirety of input member outer surface 34 and the facing hub member inner surface 52.

As in the embodiment of FIGS. 2–5, outer end 36 of input shaft 18 includes threaded passage 38, which is adapted to receive the threaded shank of screw 72 for securing hub member 22 and input member 24 together. In this version, a pair of Belleville-type spring washers 80 are placed between the head of screw 72 and outer end 36 of input shaft 18. Spring washers 80 bear on an annular outwardly facing surface 82 defined by hub member 22 and located outwardly of input shaft outer end portion 32. Spring washers 80 function in a known manner to urge hub member 22 into engagement with input member 24. When the threaded shank of screw 72 is advanced into threaded passage 38, the head of screw 72 engages spring washers 80, and the degree of advancement of screw 72 relative to input shaft 18 controls the amount of biasing force exerted by spring washers 80 on hub member 22. With slip disc 76 located between hub member 22 and input member 24, the biasing force applied by spring washers 80 urges inner surface 52 of hub member 22 into engagement with the outer surface of slip disc 76, and in turn urges the inner surface of slip disc 76 against outer surface 34 of hub member 24.

In normal operation, hub member 22 is rotated in response to application of a manual force to actuator handle 16, and rotation of hub member 22 is transferred to input member 24 through the frictional engagement of slip disc 76 between hub member 22 and input member 24. When the torque applied to actuator handle 16 exceeds a predetermined threshold, as determined by the characteristics of slip disc 76 and the degree of biasing force applied to slip disc 76 by spring washers 80, the frictional engagement provided by slip disc 76 is overcome such that hub member 22 spins freely relative to input member 24 and torque is not transferred from hub member 22 to input member 24. When the torque applied to actuator handle 16 falls below the predetermined threshold, slip disc 76 once again functions to couple hub member 22 and input member 24, to transfer rotational input force from hub member 22 to input member 24.

To adjust the threshold at which frictional engagement of hub member 22 with input member 24 through slip disc 76 is overcome, the user adjusts the degree of advancement of the shank of screw 72 within passage 38, to adjust the biasing force exerted by spring washers 80 on hub member 22. A greater degree of advancement increases the biasing force applied by spring washers 80 so as to increase the degree of frictional engagement of hub member 22 within input member 24 through slip disc 76, to increase the threshold beyond which slip disc 76 ceases to transfer torque from hub member 22 to input member 24. Conversely, a lesser degree of advancement of the threaded shank of screw 72 within passage 38 results in a lessening of the biasing force applied to hub member 22 by spring washers 80, to lower the threshold beyond which slip disc 76 does not transfer torque from hub member 22 to input member 24.

It can thus be appreciated that slip disc 76 provides the same torque transferring and limiting function as the embodiment of FIGS. 2–5, without the need for engagement members 26 and the associated recesses 40, passages 62, springs 68 and screws 66. This embodiment reduces the cost and labor associated with torque limiting mechanism 20.

It can thus be appreciated that a torque limiting mechanism 20 functions to couple the actuator handle 16 to the input shaft 18 when an actuating force below a certain threshold is applied to the actuator handle 16. The torque limiting mechanism 20 functions to de-couple the actuator handle 16 from the input shaft 18 when an excessive force is applied to the actuator handle 16 to isolate the components of the drive system from excessive force. Torque limiting mechanism 20 is relatively simple in its construction and operation, yet provides a highly effective means for protecting the components of the mobile storage unit drive system. A torque limiting mechanism 20 may be a component of original manufacture or may be retrofitted in the field to existing, previously installed mobile storage units 12.

It should be understood that the specific embodiments of the present invention shown are representative of the types of torque limiting mechanisms which may be employed for preventing application of an excessive force to the components of the drive system driven by input shaft 18. For example, another type of torque limiting mechanism, e.g. an overrunning clutch, may be used, and the torque limiting mechanism may be located at any position in the drive system of mobile storage system 10, such as between input shaft 18 and drive sprocket 28. Torque limiting mechanism 20 is therefore not limited to the specific location shown and described.

Various alternatives and embodiments are contemplated as being within the scope of the following claims particularly pointing out and distinctly claiming the subject matter regarded as the invention.

I claim:

1. In a mobile storage system including one or more movable storage units and a drive arrangement associated with each storage unit for moving the storage unit in response to manual operation of an actuator, the improvement comprising:

a torque limiting mechanism interposed between the actuator and the drive arrangement, wherein the torque limiting mechanism is operable to prevent application of an actuating force to the drive arrangement exceeding a predetermined threshold;

wherein the actuator includes a manually operable handle interconnected with the drive arrangement by means of an input shaft, and wherein the torque limiting mechanism includes an input member interconnected with the input shaft and a force-transferring arrangement interposed between the handle and the input member for transferring an actuating force below the predetermined threshold from the handle to the drive arrangement through the input member, and for preventing transfer of an actuating force exceeding the predetermined threshold from the handle to the drive arrangement through the input member;

wherein the force-transferring arrangement comprises one or more selective engagement members engaged with the handle and with the input member, and wherein the one or more selective engagement members comprise one or more spherical engagement members engaged with the handle and with the input member by means of engagement structure associated with the input member and with the handle, wherein each engagement member is normally in an engaged position in which the engagement member is engaged with the engagement structure of the input member and the handle.

2. The improvement of claim 1, further comprising a biasing element for urging each engagement member toward its engaged position.

3. The improvement of claim 1, wherein the handle is removably mounted to a hub and wherein the engagement structure associated with the handle is formed on the hub.

4. The improvement of claim 3, wherein the hub defines a passage within which the input shaft is received.

5. The improvement of claim 4, further comprising a retainer arrangement for retaining the hub on the input shaft, wherein the hub and the input member define spaced, facing surfaces within which are formed the engagement structure associated with the input member and the engagement structure associated with the handle.

6. In a mobile storage system including one or more movable storage units and a drive arrangement associated with each storage unit for moving the storage unit in response to manual operation of an actuator, the improvement comprising:

a torque limiting mechanism interposed between the actuator and the drive arrangement, wherein the torque limiting mechanism is operable to prevent application of an actuating force to the drive arrangement exceeding a predetermined threshold;

wherein the actuator includes a manually operable handle interconnected with the drive arrangement by means of an input shaft, and wherein the torque limiting mechanism includes an input member rigidly mounted to the input shaft and a force-transferring arrangement interposed between the handle and the input member for transferring an actuating force below the predetermined threshold from the handle to the drive arrangement through the input member, and for preventing transfer of an actuating force exceeding the predetermined threshold from the handle to the drive arrangement through the input member;

wherein the torque limiting mechanism further includes a hub, and wherein the hub defines a passage within which the input shaft is received, and further comprising a retainer member engageable with the input shaft for maintaining the hub in engagement with the input shaft, and wherein the force-transferring arrangement is operable to selectively couple the hub to the input member.

7. In a mobile storage system including one or more movable storage units and a drive arrangement associated with each storage unit for moving the storage unit in response to manual operation of an actuator, the improvement comprising:

a torque limiting mechanism interposed between the actuator and the drive arrangement, wherein the torque limiting mechanism is operable to prevent application of an actuating force to the drive arrangement exceeding a predetermined threshold;

wherein the actuator includes a manually operable handle interconnected with the drive arrangement by means of an input shaft, and wherein the torque limiting mechanism includes an input member interconnected with the input shaft and a force-transferring arrangement interposed between the handle and the input member for transferring an actuating force below the predetermined threshold from the handle to the drive arrangement through the input member, and for preventing transfer of an actuating force exceeding the predetermined threshold from the handle to the drive arrangement through the input member, wherein the force-transferring arrangement comprises a friction disc interposed between the handle and the input member.

8. The improvement of claim 7, further comprising biasing means for biasing the handle toward the input member so as to couple the handle to the input member through the friction disc.

9. The improvement of claim 8, wherein the handle is engaged with the input member through a threaded member engageable with the input member, and wherein the biasing means comprises a spring washer arrangement engageable with the threaded member a with the handle, wherein adjustment of the threaded member relative to the input member functions to adjust the biasing force applied by the spring washer arrangement for varying the frictional engagement of the handle with the input member through the friction disc.

* * * * *